(12) United States Patent
Yoshino et al.

(10) Patent No.: US 10,299,138 B2
(45) Date of Patent: May 21, 2019

(54) CONTROLLER AND BASE STATION

(71) Applicant: PANASONIC INTELLECTUAL PROPERTY MANAGEMENT CO., LTD., Osaka (JP)

(72) Inventors: Masaaki Yoshino, Kanagawa (JP); Yasufumi Ichikawa, Kanagawa (JP); Noriyuki Shimizu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/747,678

(22) PCT Filed: Aug. 4, 2016

(86) PCT No.: PCT/JP2016/003605
§ 371 (c)(1),
(2) Date: Jan. 25, 2018

(87) PCT Pub. No.: WO2017/043015
PCT Pub. Date: Mar. 16, 2017

(65) Prior Publication Data
US 2018/0220304 A1 Aug. 2, 2018

(30) Foreign Application Priority Data

Sep. 8, 2015 (JP) .................... 2015-176556

(51) Int. Cl.
*H04W 16/14* (2009.01)
*H04W 72/04* (2009.01)
*H04W 72/08* (2009.01)

(52) U.S. Cl.
CPC ....... *H04W 16/14* (2013.01); *H04W 72/0453* (2013.01); *H04W 72/087* (2013.01)

(58) Field of Classification Search
CPC ..... H04W 16/14; H04W 28/16; H04W 24/00; H04W 72/00; H04W 72/04;
(Continued)

(56) References Cited

U.S. PATENT DOCUMENTS 8,711,762 B2    4/2014  Murakami et al.
9,325,405 B2 *  4/2016  Jin .................... H04W 72/0493
(Continued)

FOREIGN PATENT DOCUMENTS

JP      2013-537013    9/2013
WO      2012/028764    3/2012

OTHER PUBLICATIONS

International Search Report (ISR) from International Searching Authority (Japan Patent Office) in International Pat. Appl. No. PCT/JP2016/003605, dated Oct. 25, 2016.
(Continued)

*Primary Examiner* — Nimesh Patel
(74) *Attorney, Agent, or Firm* — Greenblum & Bernstein, P.L.C.

(57) ABSTRACT

While a primary user and a secondary user are possibly co-present, a resource is efficiently allocated to the secondary user, QoS at a fixed level is provided to the secondary user of the carrier that is given a license. Provided is controller 30: including a license determiner 301 that determines whether or not a license is given to a carrier that owns each base station 40 which requests resource allocation; an allocation propriety determiner 302 that determines whether or not it is possible to allocate a resource for a secondary service, based on a used situation of a primary service, and an allocation ratio determiner 303; and an allocation ratio determiner 303 that determines a ratio of resources that are allocated to the base stations 40 that are owned by the carrier
(Continued)

which is given the license, based on a prescribed parameter, in a case where the resource allocation is possible.

15 Claims, 13 Drawing Sheets

(58) Field of Classification Search
CPC .......... H04W 36/0016; H04W 72/085; H04W 28/0268; H04W 72/044; H04W 36/005; H04W 4/21; H04W 72/10; H04W 36/14; H04W 36/22; H04W 72/0453; H04W 72/0493; H04W 72/08; H04W 16/10; H04W 24/02; H04W 60/005; H04W 72/06; H04W 76/00; H04W 12/06; H04W 12/08; H04W 4/00; H04W 4/023; H04W 60/00; H04M 15/60; H04M 15/8083; G06F 9/5077; G06F 2209/509; G06F 9/5072; G06F 2209/5014; G06F 9/5027; G06F 9/5061; G06F 15/173; H04L 67/10; H04L 47/70; H04L 67/125; H04L 67/1002; H04L 29/08144; H04L 47/80; H04L 41/0893; H04L 41/5051; H04L 41/5096; H04L 47/827; H04L 67/1008; H04L 47/762; H04L 47/828; H04H 20/71
See application file for complete search history.

(56) References Cited

U.S. PATENT DOCUMENTS

| | | | | |
|---|---|---|---|---|
| 2009/0298522 | A1* | 12/2009 | Chaudhri | H04W 16/14 455/509 |
| 2010/0220687 | A1* | 9/2010 | Reznik | H04W 36/005 370/331 |
| 2012/0014332 | A1* | 1/2012 | Smith | H04W 16/14 370/329 |
| 2012/0058790 | A1 | 3/2012 | Junell et al. | |
| 2012/0250603 | A1* | 10/2012 | Huang | H04W 72/0486 370/315 |
| 2013/0272274 | A1* | 10/2013 | Ishida | H04W 72/082 370/336 |
| 2017/0048881 | A1* | 2/2017 | Goria | H04W 72/1226 |
| 2017/0161470 | A1* | 6/2017 | Feng | G06F 21/105 |

OTHER PUBLICATIONS

The Extended European Search Report from the European Patent Office (EPO) dated Aug. 14, 2018 for the related European Patent Application No. 16843888.5.

Matinmikko Marja et al: "Spectrum sharing using licensed shared access: the concept and its workflow for LTE-advanced networks", Technical Report of Wireless Networking Group, Coordinated Science Laboratory; Dept. Electrical and Computer Engineering; University of Illinois at Urbana-Champaign, US, vol. 21, No. 2, May 12, 2014 (May 12, 2014), pp. 72-79, XP011547785.

* cited by examiner

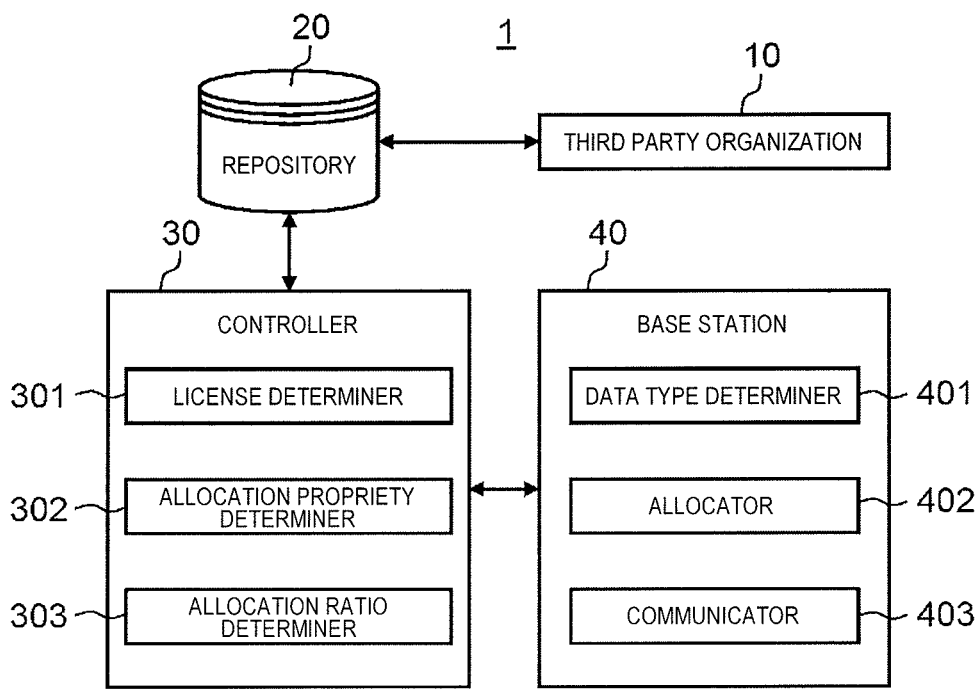

FIG. 8

|           | THROUGHPUT |
|-----------|------------|
| STATION A | 150        |
| STATION B | 50         |

FIG. 9

|           | ALLOCATION RATIO |
|-----------|------------------|
| STATION A | 0.75             |
| STATION B | 0.25             |

FIG. 10

|           | NUMBER OF FAILURES IN CONNECTION |
|-----------|----------------------------------|
| STATION A | 70                               |
| STATION B | 30                               |

FIG. 11

|           | ALLOCATION RATIO |
|-----------|------------------|
| STATION A | 0.3              |
| STATION B | 0.7              |

FIG. 13

| FREQUENCY | COMMUNICATION SCHEME | THROUGHPUT |
|---|---|---|
| f1 | LTE | 10 |
| f1 | 5G | 100 |
| f2 | 3G | 5 |
| f3 | LTE | 100 |
| f4 | LTE | 20 |
| f4 | 5G | 73 |
| f5 | 5G | 1000 |

FIG. 14

| FREQUENCY | THROUGHPUT | PRIORITY |
|---|---|---|
| f1 | 10 | 6 |
| f1 | 100 | 3 |
| f2 | 5 | 7 |
| f3 | 110 | 2 |
| f4 | 20 | 5 |
| f4 | 73 | 4 |
| f5 | 1000 | 1 |

FIG. 15

| | COMMUNICATION SCHEME PRIORITY |
|---|---|
| 5G | 1 |
| LTE | 2 |
| 3G | 3 |

FIG. 16

| FREQUENCY | COMMUNICATION SCHEME | THROUGHPUT | PRIORITY |
|---|---|---|---|
| f1 | LTE | 10 | 6 |
| f1 | 5G | 100 | 2 |
| f2 | 3G | 5 | 7 |
| f3 | LTE | 110 | 4 |
| f4 | LTE | 20 | 5 |
| f4 | 5G | 73 | 3 |
| f5 | 5G | 1000 | 1 |

CONTROLLER AND BASE STATION

TECHNICAL FIELD

The present disclosure relates to a controller that controls a used state of a resource for a secondary service, with respect to a communications carrier or a broadcasting organization (hereinafter referred to as a "carrier") that is given a license, according to a used situation of a resource for a primary service, which is allocated to an existing user, and a base station that is owned by the carrier that is given the license, which performs communication with a terminal device using a resource that is allocated by the controller.

BACKGROUND ART

In the related art, a system is known that uses a frequency which is called a white space that is not used, among frequencies that are allocated to a primary user of a primary service that is given a license. PTL 1 relates to a method that uses the white space, and discloses a method in which a wireless resource is fairly shared among a plurality of different white windows and the primary user and a secondary user of a secondary service are possibly co-present.

Furthermore, in recent years, a complementary license or model that is called licensed shared access (LSA)/authorized shared access (ASA) that is performed by causing the secondary user to acquire a license has been necessary. A system in which the LSA/ASA is applied is different from a system that uses the white space, in that acquisition of the license is required as a necessary precondition regardless of the primary user and the secondary user.

An object of the LSA is to promote introduction of a wireless system that is operated with a limited number of licenses under the individual licensing system in a case where a certain frequency band has been allocated or is scheduled to be allocated to an existing user. In the frame of the LSA, approval of the use of a frequency is provided to a user that is added, in compliance with a sharing rule that is included in the right to use a frequency. Accordingly, a terminal device of a user, to which a service for the secondary user who is given a license is provided can be provided with quality of service (QoS) at a fixed level.

CITATION LIST

Patent Literature

PTL 1: JP-T-2013-537013

SUMMARY OF THE INVENTION

However, the main purpose of a device in the related art is to achieve the co-presence of the primary user and the secondary user by a resource being sharing between the primary user and the secondary user. A problem with the device in the related art is that the resource can be efficiently allocated to the secondary user. Therefore, there is a concern that a secondary user who cannot be provided with QoS at a fixed level will be present regardless of the license being given, among secondary users.

An object of the present disclosure is to provide a controller and a base station that are capable of efficiently allocating a resource to a secondary user and are capable of providing QoS at a fixed level to the secondary user of the carrier that is given a license, while a primary user and the secondary user are possible co-present.

According to an aspect of the present disclosure, there is provided a controller that controls a used state of a resource for a secondary service, with respect to a carrier that is given a license, according to a used situation of a resource for a primary service that is allocated to an existing user, the controller that is configured to include: a license determiner that determines whether or not the license is given to the carrier that owns each base station which requests resource allocation; an allocation propriety determiner that determines whether or not it is possible to allocate a resource for the secondary service, based on a used situation of the primary service; and an allocation ratio determiner that determines a ratio of resources that are allocated to base stations that are owned by the carrier which is given the license, based on a prescribed parameter, in a case where the allocation of the resource is possible.

According to another aspect of the present disclosure, there is provided a base station that is owned by a carrier which is given a license, which performs communication with a terminal device, using a resource that is allocated by the controller, the base station that is configured to include: a communication propriety determiner that determines whether or not communication with the controller is possible; a resource candidate determiner that determines a candidate for a resource that is used for the communication with the terminal device, based in a prescribed priority, in a case where the communication with the controller is impossible; an allocation propriety determiner that determines whether or not it is possible to allocate the candidate for the each resource for the communication with the terminal device based on a communication environment; and a communicator that performs the communication with the terminal device using a resource that is determined as being allocable.

According to the present disclosure, a resource can be efficiently allocated to a secondary user and QoS at a fixed level can be provided to the secondary user of the carrier that is given a license, while a primary user and the secondary user are possible co-present.

BRIEF DESCRIPTION OF DRAWINGS

FIG. 1 is a block diagram illustrating a configuration of a communication system according to a first embodiment.

FIG. 2 is a diagram illustrating an example of an amount of data that is requested by a base station according to the first embodiment.

FIG. 3 is a diagram illustrating an example of a result of allocation by a controller according to the first embodiment.

FIG. 8 is a diagram illustrating an example of average throughput of a base station according to the second embodiment.

FIG. 9 is a diagram illustrating an example of a result of allocation by a controller according to the second embodiment.

FIG. 10 is a diagram illustrating an example of the number of failures in connection by the base station according to the second embodiment.

FIG. 11 is a diagram illustrating an example of the result of the allocation by the controller according to the second embodiment.

FIG. 13 is a diagram illustrating an example of the communication results information that is stored in a base station according to the third embodiment.

FIG. 14 is a diagram illustrating an example of a priority that is set by the base station according to the third embodiment.

FIG. 15 is a diagram illustrating an example of the communication results information that is stored in the base station according to the third embodiment.

FIG. 16 is a diagram illustrating an example of the priority that is set by the base station according to the third embodiment.

DESCRIPTION OF EMBODIMENTS

Figure 4:
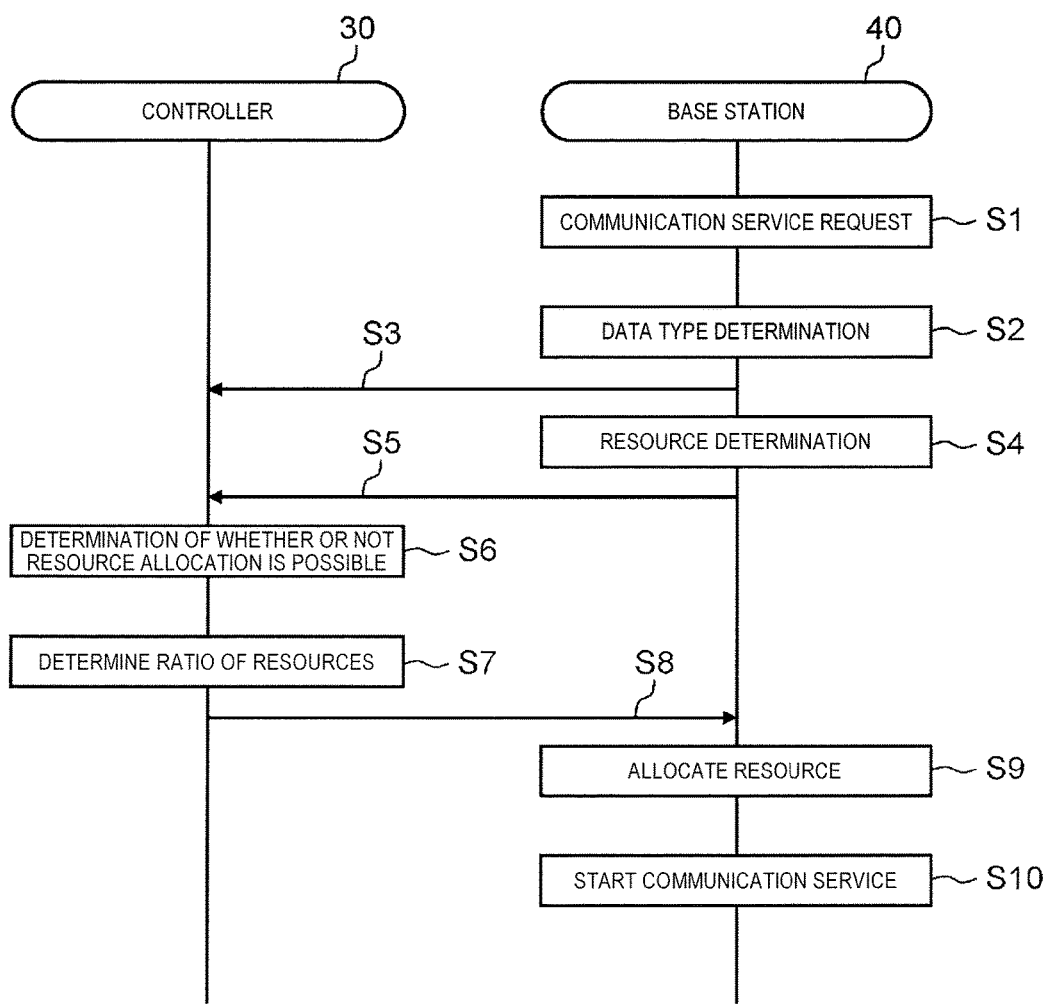
FIG. 4 is a sequence diagram illustrating a procedure for communication between the controller and the base station according to the first embodiment.

Embodiments in the present disclosure will be described in detail below suitably with reference to the drawings.

First Embodiment

<Configuration of a Communication System>

A configuration of communication system 1 according to a first embodiment will be described in detail below with reference to FIG. 1.

Communication system 1 is a system to which LSA is typically applied. Communication system 1 has repository 20 in which information is stored, controller 30, and base station 40. At least repository 20 and controller 30 are set to be managed by third party organization 10.

Third party organization 10 performs managing of the time and place that are available to a primary user and the time and place that are available to a secondary user. Third party organization 10 stores information on carriers that are given licenses, with which the primary user and the secondary user contract, in repository 20.

The information on the carriers that are given the licenses, with which the primary user and the secondary user contract, is stored in repository 20.

In a case where by receiving from base station 40 a resource allocation request signal that requests resource allocation, controller 30 receives a resource allocation request from base station 40, controller 30 controls a state where the secondary user uses a resource, according to a used situation of a resource that is allocated to the primary user who is an existing user, referring to information that is stored in repository 20. Configuration of controller 30 will be described in detail below.

Base station 40 is a base station that is given the license, of the secondary user, and performs communication with a terminal device that is not illustrated, using a resource that is allocated by controller 30. Base station 40 may be configured to integrally include operation, administration, and maintenance (OA & M) that are functions for performing operation, administration, and maintenance of a network, and without including the OA & M, may be configured to perform communication with OA & M in separate forms. Configuration of base station 40 will be described in detail below.

<Configuration of the Controller>

Next, a configuration of controller 30 according to the present embodiment will be described in detail below with reference to FIG. 1.

Controller 30 has license determiner 301, allocation propriety determiner 302, and allocation ratio determiner 303.

Referring to the information that is stored in repository 20, license determiner 301 determines whether or not a license is given to a carrier that owns each base station 40 which requests the resource allocation.

Allocation propriety determiner 302 determines whether or not it is possible to allocate a resource for a secondary service to each base station 40 that is determined by license determiner 301 as being each base station 40 that requests the resource allocation, which is owned by the carrier that is given the license, based on a used situation of the carrier with which the primary user who uses a primary service contracts.

Allocation ratio determiner 303 extracts data type information from the resource allocation request signal that is received from base station 40. In a case where it is a predetermined by allocation propriety determiner 302 that the resource allocation is possible, allocation ratio determiner 303 determines a ratio of resources that are allocated to base stations 40, based on a data type that is a prescribed parameter that is indicated by the extracted data type information.

Specifically, allocation ratio determiner 303 determines the ratio of resources that are allocated to base stations 40, according to a data amount of guaranteed bit rate (GBR) data that is requested by each base station 40. For example, as illustrated in FIG. 2, in a case where a sum of amounts of data that are requested by a base station A is 200 Gbps and an amount of guaranteed bit rate (GBR) data is 150 Gbps, which is smaller than the sum, and where a sum of amounts of data that are requested by a base station B is 300 Gbps and an amount of guaranteed bit rate (GBR) data is 50 Gbps, which is smaller than the sum, allocation ratio determiner 303, as illustrated in FIG. 3, allocates 75% of resources to the base station A and allocates 25% of resources to the base station B, based on a ratio of the amounts of guaranteed bit rate (GBR) data.

Instead of the data amount of guaranteed bit rate data, allocation ratio determiner 303 may determine the ratio of resources that are allocated to the base stations 40, using the number of users who use a service that uses the guaranteed bit rate data, or the number of applications.

Allocation ratio determiner 303 transmits allocation resource information indicating the determined resource to base station 40.

<Configuration of the Base Station>

Next, a configuration of base station 40 according to the present embodiment will be described in detail below with reference to FIG. 1.

Base station 40 has data type determiner 401, allocator 402, and communicator 403.

Data type determiner 401 determines a data type of data that is transferred according to a service that is requested from the terminal device.

Allocator 402 determines a resource that is to be used, based on the data type that is determined by data type determiner 401, and transmits resource information indicating the determined resource and the data type information indicating the data type that is determined in data type determiner 401, in a state of being included in the resource allocation request signal, to controller 30. Allocator 402 allocates the resource that is indicated by the allocation resource information that is received from controller 30, for communication with the terminal device.

Communicator 403 performs wireless communication with the terminal device using the allocated resource.

<Procedure for Communication Between the Controller and the Base Station>

Next, a procedure for communication between controller 30 and base station 40 according to the present embodiment will be described in detail below with reference to FIG. 4.

For convenience of description, a procedure for communication between controller 30 and one base station 40 is illustrated in FIG. 4.

Controller 30 simultaneously transmits a message containing an instruction to transmit the resource allocation request signal, to each base station 40. Instead of controller 30 simultaneously transmitting the message containing the instruction to transmit the resource allocation request signal, the resource allocation request signal may be transmitted at a timing that is predetermined, from each base station 40 to controller 30.

As illustrated in FIG. 4, data type determiner 401 of base station 40 receives a service request from the terminal device (S1).

Next, data type determiner 401 determines a type of data that is transferred, from the service request that is received from the terminal device (S2). Specifically, data type determiner 401 determines whether an application that is used by the terminal device is, for example, for streaming or for file download. Furthermore, data type determiner 401 determines an amount of band necessary for securing quality of the application. In the case of the streaming for which a band of 100 Mbps is necessary, it is determined that GBR 100 Mbps is required, and in the case of the file download for which a band is unnecessary, it is determined that unguaranteed bit rate data is required. At this point, as examples of the data type, guaranteed bit rate (GBR) data and unguaranteed bit rate data are given.

Next, data type determiner 401 transmits a carrier information ID indicating a carrier that owns base station 40 itself, to controller 30 (S3).

Next, allocator 402 of base station 40 determines a resource that is to be used, based on a result of the determination of the data type (S4). Specifically, allocator 402 determines that, as resources that are to be used, a bandwidth of the guaranteed bit rate data is, for example, 100 MHz, and a frequency band is a band of 3.55 GHz.

Next, allocator 402 transmits the resource information indicating the determined resource, and the data type information indicating the data type that is determined in the data type determiner 401, in a state of being included in the resource allocation request signal, to controller 30 (S5).

Next, referring to the information that is stored in repository 20, license determiner 301 of controller 30 that receives the carrier information ID and the resource allocation request signal determines whether or not a license is given to a carrier that is consistent with the carrier information ID which is received from base station 40. Furthermore, allocation propriety determiner 302 of controller 30 determines whether it is possible to allocate the resource for the secondary service to base station 40 that is owned by the carrier which is given the license, based on the used situation of the carrier with which the primary user contracts (S6).

Next, in a case where the resource allocation is possible, allocation ratio determiner 303 of controller 30 determines the ratio of resources that are allocated to base stations 40, based on the data type that is indicated by the data type information that is included in the resource allocation request signal which is received from base station 40 (S7).

Next, allocation ratio determiner 303 notifies base station 40 of the allocation resource information indicating the determined resource (S8).

Next, allocator 402 of base station 40 allocates a resource to the terminal device, based on the received allocation resource information (S9).

Next, communicator 403 starts a service by performing the wireless communication with the terminal device, using the resource that is allocated to the terminal device (S10).

<Operation of the Controller>

Figure 5:
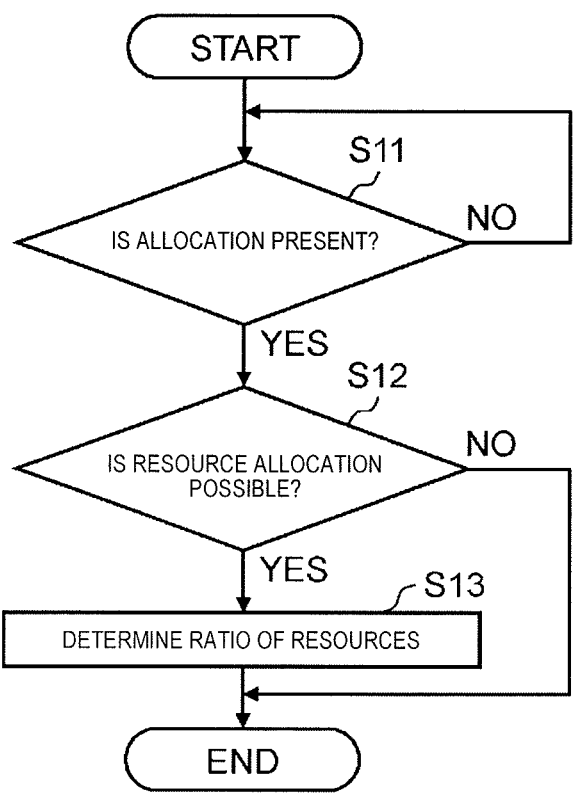
FIG. 5 is a flow diagram illustrating operation of the controller according to the first embodiment.

Next, operation of controller 30 according to the present embodiment will be described in detail below with reference to FIG. 5.

First, license determiner 301 determines whether or not the resource allocation request from base station 40 is present (S11).

In a case where the resource allocation request is not present (NO in S11), license determiner 301 repeats the processing in S11.

On the other hand, in a case where the resource allocation request is present (YES in S11), allocation propriety determiner 302 determines whether or not it is possible to allocate the resource for the secondary service to base station 40 that is owned by the carrier which is given the license, based on the used situation of the carrier with which the primary user contracts (S12).

In a case where the resource allocation is possible (YES in S12), allocation ratio determiner 303 determines the ratio of resources that are allocated to base stations 40 based on the data type (S13). On the other hand, in a case where the resource allocation is impossible (NO in S12), a flow in FIG. 5 is ended.

<Operation of the Base Station>

Next, operation of base station 40 according to the present embodiment will be described in detail below with reference to FIG. 6.

First, data type determiner 401 determines whether or not the service request from the terminal device is present (S21).

In a case where the service request from the terminal device is not present (NO in S21), data type determiner 401 repeats the processing in S21.

On the other hand, in a case where the service request from the terminal device is present (YES in S21), data type determiner 401 determines the data type in the same manner as in S2 (S22).

Next, allocator 402 transmits the resource allocation request signal in order to make the resource allocation request to controller 30 (S23).

Next, allocator 402 determines whether or not the resource allocation is possible, based on the allocation resource information that is received from controller 30 (S24). Specifically, allocator 402 receives from controller 30 the allocation resource information that, as the resources that are allocable, the bandwidth is, for example, 50 MHz and the frequency band is a band of 3.55 GHz. Allocator 402 performs comparison of the resource information, the request for which is made to controller 30 and which is determined in S4, and the resource information is notified by controller 30, and determines whether or the allocation is possible. In the case of the resources that are allocated such as when a bandwidth of wireless resource information that is requested, for example, is set to be 100 MHz and the frequency band is set to be a band of 3.55 GHz, allocator 402 determines that it is possible to allocate half as wide a bandwidth as is requested. Furthermore, in the case of the resources that are allocated such as when the bandwidth of the wireless resource information that is requested, for example, is set to be 50 MHz and the frequency band is set to be a band of 2.3 GHz, although there is a difference in frequency band, if a base station apparatus and the terminal device support a band of 2.3 GHz, allocator 402 determines that the allocation is possible.

In a case where the resource allocation is possible from the allocation resource information that is received from controller 30 (YES in S24), allocator 402 allocates a resource to the terminal device based on the received allocation resource information (S25).

On the other hand, in a case where the resource allocation is impossible from the allocation resource information that is received from controller 30 (NO in S24), base station 40 is in a call loss state or in a standby state (S26).

As described above, according to the present embodiment, it is determined whether or not it is possible to allocate the resource for the secondary service, based on the used situation of the primary service, and in the case where the resource allocation is possible, the ratio of resources that are allocated to base stations 40 that are owned by the carrier which is given the license is determined based on the data type. Thus, while the primary user and the secondary user are possibly co-present, the resource can be efficiently allocated to the secondary user and QoS at a fixed level can be provided to the secondary user of the carrier that is given the license.

Second Embodiment

<Configuration of a Communication System>

A configuration of communication system 2 according to a second embodiment will be described in detail below with reference to FIG.

Figure 7:
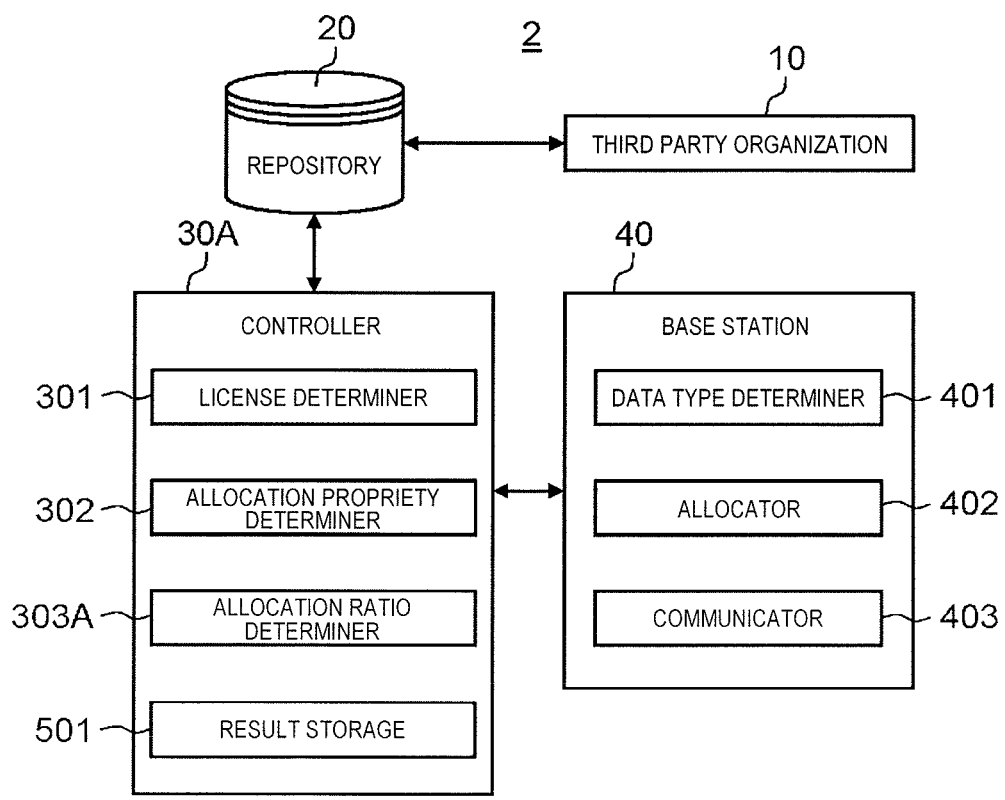
FIG. 7 is a block diagram illustrating a configuration of a communication system according to a second embodiment.

In communication system 2 that is illustrated in FIG. 7, constituents that are the same as those in communication system 1 that is illustrated in FIG. 1 are given the same reference numerals, and descriptions thereof are omitted. Communication system 2 that is illustrated in FIG. 7 has controller 30A with a different configuration, when compared with communication system 1 that is illustrated in FIG. 1.

<Configuration of the Controller>

Controller 30A that is illustrated in FIG. 7 employs a configuration that results from adding result storage 501 when compared with controller 30 that is illustrated in FIG. 1. Furthermore, a function of allocation ratio determiner 303A of controller 30A is different from that of allocation ratio determiner 303 of controller 30.

Communication results information indicating communication results with each base station 40 is stored in result storage 501. At this point, the communication results information is information indicating a past communication history (for example, from 100 hours ago to the present) in each base station 40, and, for example, is a time span over for which the communication is performed, a day of the week on which the communication is performed, throughput, the number of failures in connection, an amount of data, or a combination of these, each base station 40.

In a case where it is determined by allocation propriety determiner 302 that the resource allocation is possible, allocation ratio determiner 303A determines the ratio of resources that are allocated to base stations 40 that are owned by the carrier with which the secondary user contracts, which is given the license, referring to the communication results information that is stored in result storage 501. Allocation ratio determiner 303A notifies base station 40 of the allocation resource information indicating the determined resource.

For example, in a case where, as illustrated in FIG. 8, average throughput of the base station A is 150 Gbps and where average throughput of the base station B is 50 Gbps, allocation ratio determiner 303A, as illustrated in FIG. 9, sets the ratio of resources that are allocated to the base station A to 75% and sets the ratio of resources that are allocated to the base station B to 25%. In this manner, in a case where the average throughput of each base station 40 is stored in result storage 501, allocation ratio determiner 303A determines the ratio of resources that are allocated to base stations 40, according to the average throughput of each base station 40.

Furthermore, as illustrated in FIG. 10, in a case where the number of failures in connection by the base station A to the terminal device is 70 and where the number of failures in connection by the base station B is 30, allocation ratio determiner 303A, as illustrated in FIG. 11, sets the ratio of resources that are allocated to the base station A to 30% and sets the ratio of resources that are allocated to the base station B to 70%. In this manner, in a case where the number of failures in connection by each base station 40 is stored in result storage 501, allocation ratio determiner 303A determines the ratio of resources that are allocated to base stations 40, according to the number of failures in connection by base station 40.

As described above, according to the present embodiment, it is determined whether or not it is possible to allocate the resource for the secondary service, based on the used situation of the primary service, and in the case where the resource allocation is possible, the ratio of resources that are allocated to base stations 40 that are owned by the carrier which is given the license is determined based on the communication results information. Thus, while the primary user and the secondary user are possibly co-present, the resource can be efficiently allocated to the secondary user and QoS at a fixed level can be provided to the secondary user of the carrier that is given the license.

Third Embodiment

<Configuration of a Communication System>

A configuration of communication system 3 according to a third embodiment will be described in detail below with reference to FIG. 12.

Figure 12:
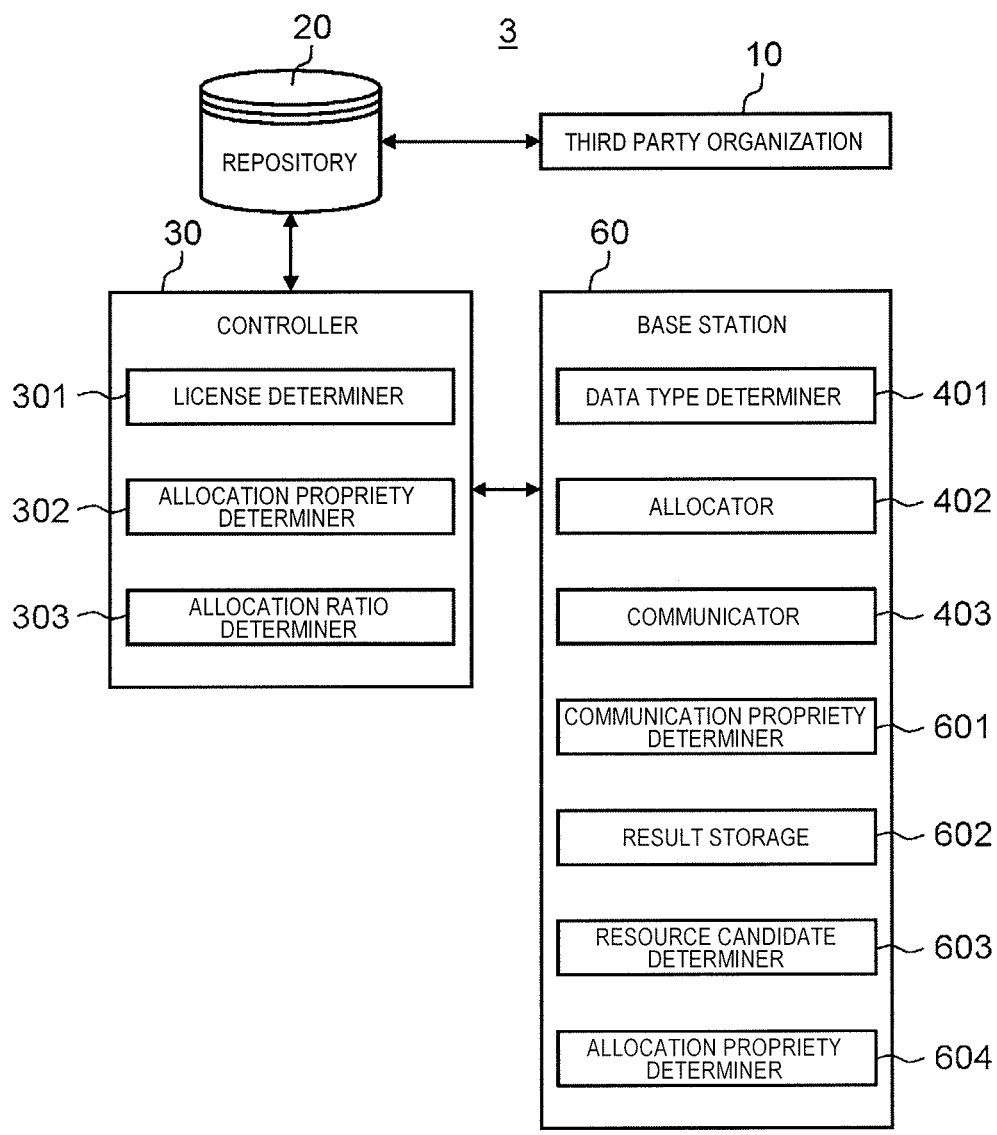
FIG. 12 is a block diagram illustrating a configuration of a communication system according to a third embodiment.

In communication system 3 that is illustrated in FIG. 12, constituents that are the same as those in communication system 1 that is illustrated in FIG. 1 are given the same reference numerals, and descriptions thereof are omitted. Communication system 3 that is illustrated in FIG. 12 has base station 60 with a different internal configuration, when compared with communication system 1 that is illustrated in FIG. 1.

<Configuration of the Base Station>

Base station 60 that is illustrated in FIG. 12 employs a configuration that results from adding communication propriety determiner 601, result storage 602, resource candidate determiner 603, and allocation propriety determiner 604, when compared with base station 30 that is illustrated in FIG. 1.

Communication propriety determiner 601 determines whether or communication with controller 30 is possible.

The communication results information indicating results of communication by base station 60 itself is stored in result storage 602. The communication results information according to the present embodiment, as illustrated in FIG. 13, for example, is information that results from associating a frequency that is allocable as a resource and a communication scheme for and throughput of each frequency with each other.

In a case where it is determined by communication propriety determiner 601 that the communication with controller 30 is impossible, resource candidate determiner 603 sets a priority of each resource based on the communication results information that is stored in result storage 602, and determines a candidate for a resource that is used for communication with the terminal device in order of lowering the priority.

For example, resource candidate determiner 603, as illustrated in FIG. 14, the priority is set in such a manner that the higher throughput a resource (a frequency) has, the higher priority the resource (the frequency) has. Alternatively, as illustrated in FIG. 15, in a case where a priority of a communication scheme is further stored as the communication results information, resource candidate determiner 603, as illustrated in FIG. 16, adds the priority of the communication scheme to the throughput of each resource and thus sets the priority of the resource (the frequency). Specifically, in FIG. 15, regarding 5G that has a priority "1" of the communication scheme, as the throughput is increased, the priority is increased. Next, regarding LTE that has a priority "2" of the communication scheme, as the throughput is increased, the priority is increased. Lastly, regarding 3G that has a priority "3" of the communication scheme, as the throughput is increased, the priority is increased.

Allocation propriety determiner 604 determines whether or not it is possible to allocate the candidate for each resource that is determined by resource candidate determiner 603 for the communication with the terminal device, based on a communication environment. For example, in the case of FIG. 14, a priority of frequency f5 is the highest, allocation propriety determiner 604 first determines whether or not frequency f5 is possible allocated for the communication with the terminal device. As an example of the communication environment, a level of a signal that is received in base station 60 from each terminal device or other base stations is given.

Communicator 403 performs the wireless communication with the terminal device using the resource that is determined by allocation propriety determiner 604 as being allocable.

<Operation of a Base Station>

Figure 17:
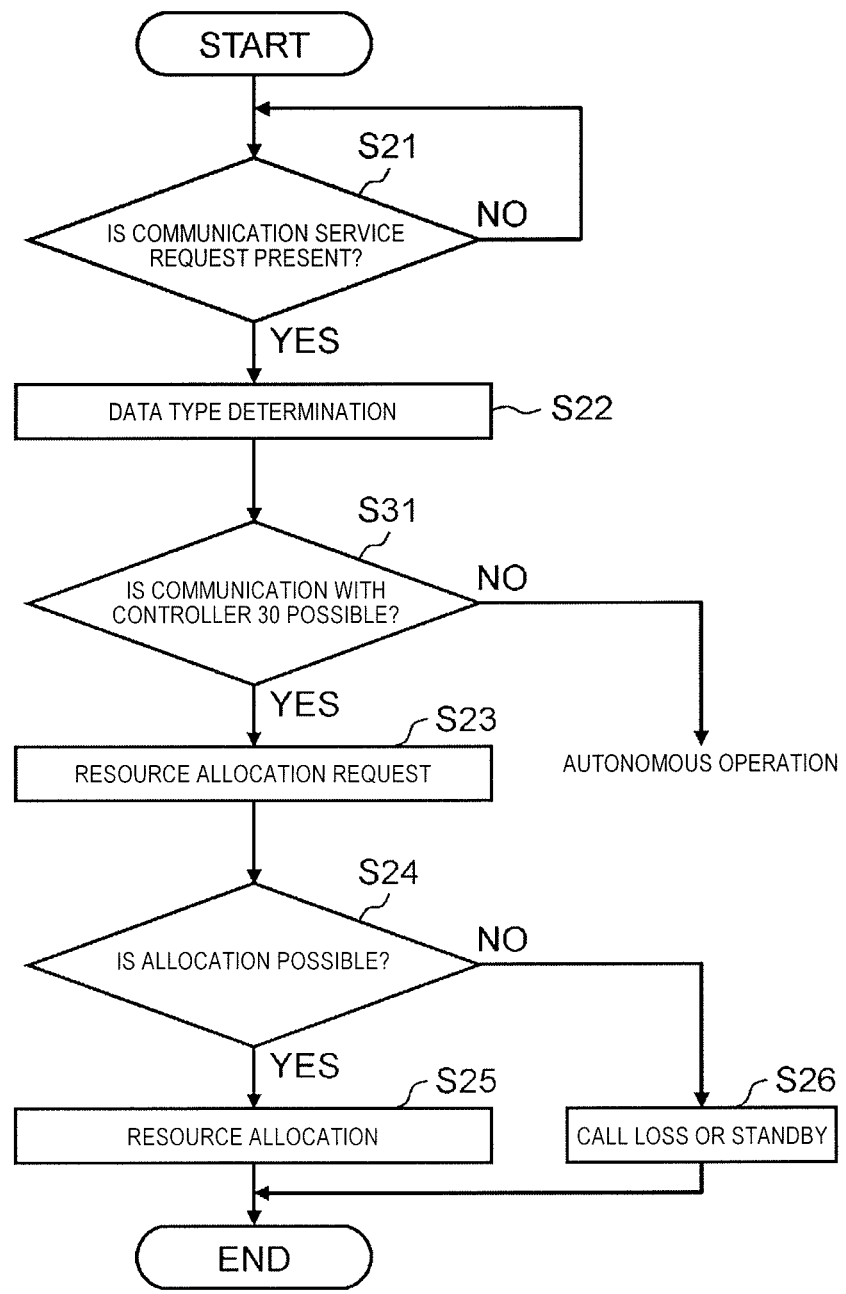
FIG. 17 is a flow diagram illustrating operation of the base station according to the third embodiment.

Next, operation of base station 60 according to the present embodiment will be described in detail below with reference to FIG. 17. In FIG. 17, steps that are the same as those in FIG. 6 are given the same reference numerals, and descriptions thereof are omitted.

Figure 6:
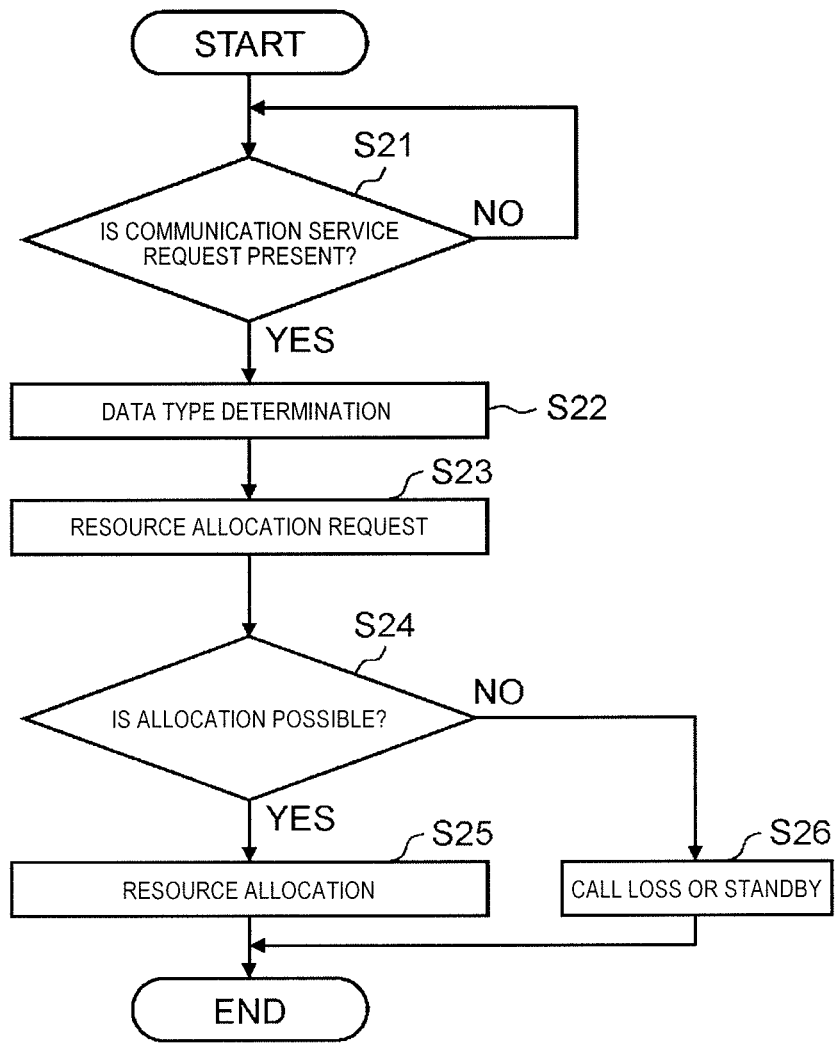
FIG. 6 is a flow diagram illustrating operation of the base station according to the first embodiment.

In a flow that is illustrated in FIG. 17, in contrast to FIG. 6, step S31 is interposed between S22 and S23. In S31, communication propriety determiner 601 determines whether or the communication with controller 30 is possible.

Figure 18:
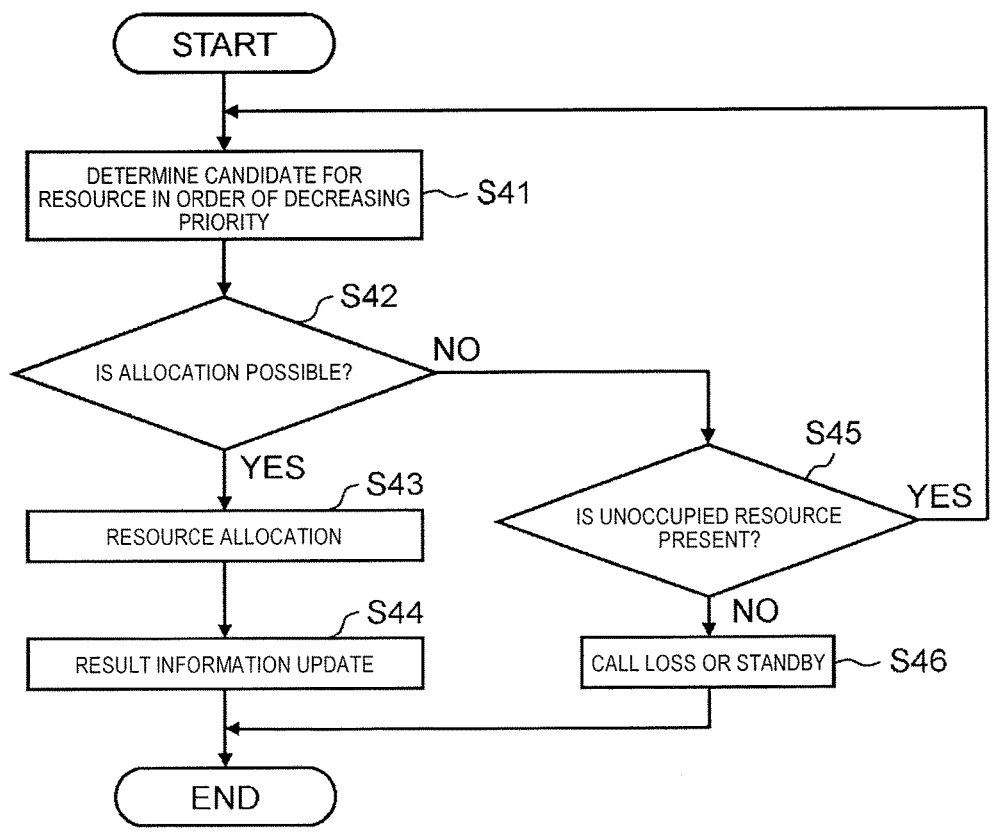
FIG. 18 is a flow diagram illustrating autonomous operation of the base station according to the third embodiment.

In a case where the communication with controller 30 is possible (YES in S31), the flow proceeds to S23. On the other hand, in a case where the communication with controller 30 is impossible (NO in S31), the flow proceeds to an autonomous operation that is illustrated in FIG. 18. The autonomous operation is an operation in which base station 60 autonomously allocates a resource that is shared among secondary users to the terminal device without depending on controller 30.

<Autonomous Operation of the Base Station>

Next, autonomous operation of base station 60 according to the present embodiment will be described in detail below with reference to FIG. 18.

First, based on the communication results information that is stored in result storage 602, resource candidate determiner 603 determines the candidate for the resource that is shared among the secondary users, which are used for the communication with the terminal device, in order of lowering the priority (S41).

Next, based on the communication environment, allocation propriety determiner 604 determines whether the candidate (the candidate that has the highest priority, among the candidates, before the determination) for the resource that is determined by resource candidate determiner 603 is allocated for the communication with the terminal device (S42). Regarding the determination that is based on the communication environment, for example, it may be determined that the allocation is possible, in a case where a reception power of the determined candidate for the resource is less than a threshold, and it may be determined that the allocation is impossible, in a case where the reception power is equal to or higher than the threshold.

In a case where it is determined that a candidate for a target resource is allocable (YES in S42), allocation propriety determiner 604 allocates the resource for the communication with the terminal device (S43) and stores the communication results in result storage 602 (S44). Communicator 403 performs the wireless communication with the terminal device using the resource that is allocated by allocation propriety determiner 604.

On the other hand, in a case where it is determined that the allocation of the candidate for the target resource is impossible (NO in S42), allocation propriety determiner 604 determines whether or not other unoccupied resources are available (S45).

In a case where other unoccupied resources are available (YES in S45), the flow returns to S41, and processing that determines whether or not a next candidate for the resource is allocable is performed.

On the other hand, in a case where other unoccupied resources are not available (NO in S45), base station 60 is in the call loss state or in the standby state (S46).

<Return Operation of the Base Station>

Next, return operation of base station 60 according to the present embodiment will be described in detail below with reference to FIGS. 19 and 20. The return operation is an operation that makes an attempt to make a connection to controller 30 after the autonomous operation.

First, a flow in FIG. 19 will be described. FIG. 19 illustrates the flow that is performed by base station 60 in a case where the allocation request for the resource that is shared among the secondary users, which is secured at the autonomous operation is made to controller 30 immediately after communication with controller 30 became possible (without waiting for a timing for the allocation of the sharing resource).

When base station 60 performs the autonomous operation that is illustrated in FIG. 18, communication propriety determiner 601 determines whether or not the communication with controller 30 is possible (S51).

In a case where the communication with controller 30 is impossible (NO in S51), base station 60 continues the autonomous operation.

On the other hand, in a case where the communication with controller 30 is possible (YES in S51), allocator 402 determines whether or not the controller 30 has a sharing resource that is allocated at the autonomous operation without obtaining an approval (S52).

Figure 19:
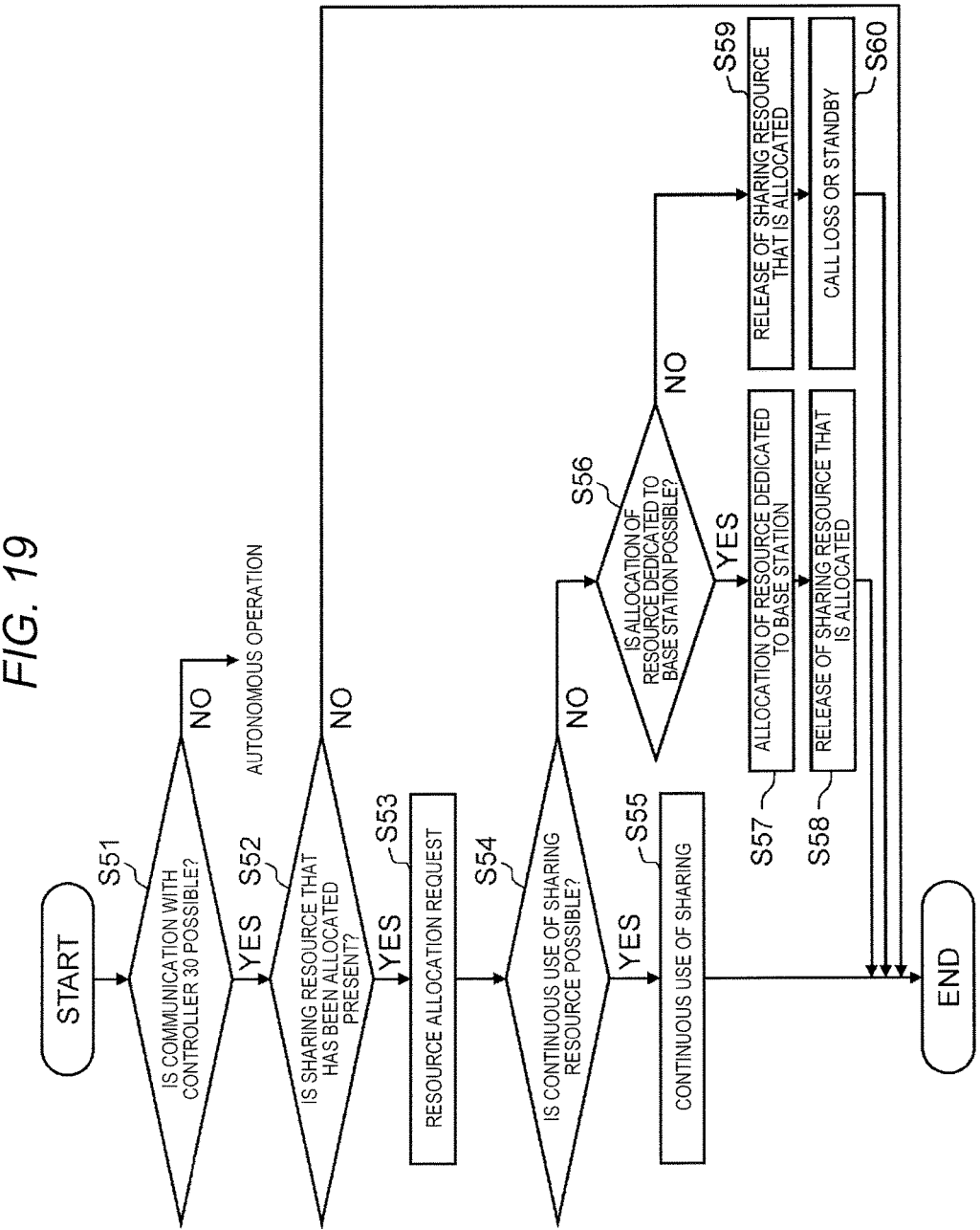
FIG. 19 is a flow diagram illustrating return operation of the base station according to the third embodiment.

In a case where the sharing resource that is allocated at the autonomous operation is not unavailable (NO in S52), the flow in FIG. 19 is ended.

On the other hand, in a case where the sharing resource that is allocated at the autonomous operation is available (YES in S52), allocator 402 transmits the resource allocation request signal that includes information on an in-use frequency band indicating the sharing resource (the frequency band) and the data type information indicating the data type that is determined in data type determiner 401, to controller 30 (S53).

Next, referring to the allocation resource information that is received from controller 30, allocator 402 determines whether or not the continuous use of the sharing resource that is allocated at the autonomous operation is possible (S54).

In a case where the sharing resource that is allocated at the autonomous operation continues to be usable (YES in S54), communicator 403 performs the wireless communication with the terminal device using the sharing resource that has been already allocated at the autonomous operation (S55).

On the other hand, in a case where the continuous use of the sharing resource that is allocated at the autonomous operation is impossible (NO in S54), allocator 402 determines whether or not a resource dedicated to the base station that obtains the license, which is different from the resource that is shared by the primary user and the secondary user, is allocable (S56).

In a case where the resource dedicated to the base station is allocable (YES in S56), allocator 402 allocates the resource dedicated to the base station (S57) and releases the sharing resource that is allocated at the autonomous operation (S58).

On the other hand, in a case where the allocation of the resource dedicated to the base station is impossible (NO in S56), allocator 402 releases the sharing resource that is allocated at the autonomous operation (S59). In this case, the terminal that performs the wireless communication with base station 60 is in the call loss state or in the standby state (S60).

Next, a flow in FIG. 20 will be described. FIG. 20 illustrates a flow that is performed in a case where base station 60 can continuously use the resource that is shared among the secondary users, which is secured at the autonomous operation until the timing for the allocation of the sharing resource by controller 30 comes.

When base station 60 performs the autonomous operation that is illustrated in FIG. 18, communication propriety determiner 601 determines whether or not the communication with controller 30 is possible (S71).

In a case where the communication with controller 30 is impossible (NO in S71), base station 60 continues the autonomous operation.

On the other hand, in a case where the communication with controller 30 is possible (YES in S71), allocator 402 determines whether or not the controller 30 has a sharing resource that is allocated at the autonomous operation without obtaining an approval (S72).

Figure 20:
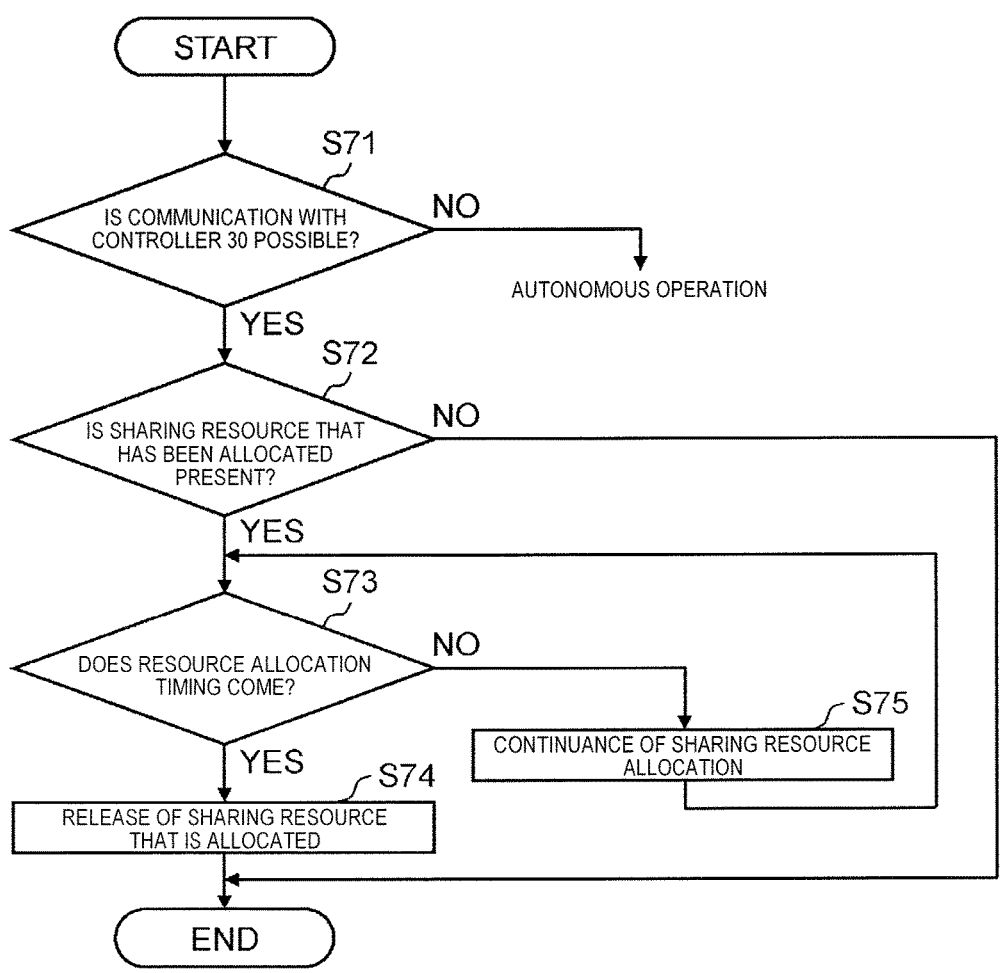
FIG. 20 is a flow diagram illustrating the return operation of the base station according to the third embodiment.

In a case where the sharing resource that is allocated at the autonomous operation is not unavailable (NO in S72), the flow in FIG. 20 is ended.

On the other hand, in a case where the sharing resource that is allocated at the autonomous operation is available (YES in S72), allocator 402 determines whether or not the timing for allocation of the resource in controller 30 comes (S73).

In a case where it is time to allocate the resource by controller 30 (YES in S73), allocator 402 releases the sharing resource that is allocated at the autonomous operation (S74).

On the other hand, in a case where it is not time to allocate resources by controller 30 (NO in S73), allocator 402 continues to use the sharing resource that is allocated at the autonomous operation (S75).

As described above, according to the present embodiment, in a case where the communication with controller 30 is impossible, candidates for the resource that is used for the communication with the terminal device are determined in order of lowering the priority, it is determined whether or not it is possible to allocate a candidate for each resource for the communication with the terminal device, based on the communication environment, and the communication with the terminal device is performed using a resource at the highest priority among the resources that are allocable. Accordingly, in addition to an effect according to the first embodiment, even in a case where the communication with the controller is impossible, a resource can be efficiently allocated to the secondary user, and QoS at a fixed level can be provided to the secondary user of the carrier that is given the license.

According to the embodiment, controller 30 may allocate a resource at the resource allocation request that is made when base station 60 performs the return operation, which is preferred to a normal resource allocation request. Accordingly, base station 60 that is connected to controller 30 with the return operation has an increasing likelihood that the sharing resource that is allocated at the autonomous operation will continue to be used.

Types, arrangements, the number, and the like of members in the present disclosure are not limited to the embodiments described above, and modifications can be made to the present disclosure within the scope that does not depart from the gist of the disclosure, such as substitution of a constituent element that has an operation and an effect which are equivalent to those of a constituent element of each of these.

INDUSTRIAL APPLICABILITY

The present disclosure is suitable for a controller that controls a used state of a resource for a secondary service that is provided by a carrier which is given a license, according to a used situation of a resource for a primary service, which is allocated to an existing user, and for a base station that is owned by the carrier that is given the license, which performs communication with a terminal device using a resource that is allocated to the base station by the controller.

REFERENCE MARKS IN THE DRAWINGS

1, 2, 3 COMMUNICATION SYSTEM
10 THIRD PARTY ORGANIZATION
20 REPOSITORY
30, 30A CONTROLLER
40, 60 BASE STATION
301 LICENSE DETERMINER
302 ALLOCATION PROPRIETY DETERMINER 303, 303A ALLOCATION RATIO DETERMINER
401 DATA TYPE DETERMINER
402 ALLOCATOR
403 COMMUNICATOR
501 RESULT STORAGE
601 COMMUNICATION PROPRIETY DETERMINER
602 RESULT STORAGE
603 RESOURCE CANDIDATE DETERMINER
604 ALLOCATION PROPRIETY DETERMINER

The invention claimed is:

1. A controller that controls a used state of a resource for a secondary service, with respect to a carrier that is given a license, according to a used situation of a resource for a primary service that is allocated to an existing user, the controller comprising:
a license determiner that determines whether or not the license is given to the carrier that owns each base station which requests resource allocation;
an allocation propriety determiner that determines whether or not it is possible to allocate the resource for the secondary service, based on the used situation of the resource for the primary service; and
an allocation ratio determiner that determines a ratio of resources that are allocated to base stations that are owned by the carrier which is given the license, based on a prescribed parameter, in a case where allocation of the resource is possible,
wherein the allocation ratio determiner transmits allocation resource information to the base stations, the allocation resource information indicating the ratio of resources that are allocated to the base stations, and
the allocation ratio determiner determines the ratio of resources that are allocated to the base stations, based on a data amount of data of a specific type, of which allocation is requested by each base station.

2. The controller of claim 1,
wherein the data of the specific type is a guaranteed bit rate data.

3. The controller of claim 1,
wherein the allocation ratio determiner further determines the ratio of resources that are allocated to the base stations, based on communication results of each base station.

4. The controller of claim 3,
wherein the communication results is information on any one or a combination of a time span for which communication is performed, a day of the week on which the communication is performed, throughput, a number of failures in connection, and an amount of data in each base station.

5. A base station that is owned by the carrier which is given the license, which performs communication with a terminal device, using the resource that is allocated by the controller of claim 1, the base station comprising:
a communication propriety determiner that determines whether or not communication with the controller is possible;
a resource candidate determiner that determines a candidate for a resource that is used for the communication with the terminal device, based in a prescribed priority, in a case where the communication with the controller is impossible;
an allocation propriety determiner that determines whether or not it is possible to allocate the candidate for the resource for the communication with the terminal device based on a communication environment; and
a communicator that performs the communication with the terminal device using the resource that is determined as being allocable.

6. The base station of claim 5,
wherein the resource candidate determiner sets a priority in such a manner that a higher throughput a resource has, a higher priority the resource has.

7. The base station of claim 5,
wherein the resource candidate determiner sets a priority of a resource, based on a communication scheme and throughput of each resource.

8. A system that controls a used state of a resource for a secondary service, with respect to a carrier that is given a license, according to a used situation of a resource for a primary service that is allocated to an existing user, the system comprising:
a repository that stores information; and
a controller that:
determines, by referring to the information stored in the repository, whether or not the license is given to the carrier that owns each base station which requests resource allocation;
determines whether or not it is possible to allocate the resource for the secondary service, based on the used situation of the resource for the primary service;
determines a ratio of resources that are allocated to base stations that are owned by the carrier which is given the license, based on a prescribed parameter, in a case where allocation of the resource is possible; and
transmits allocation resource information to the base stations, the allocation resource information indicating the ratio of resources that are allocated to the base stations,
wherein the controller determines the ratio of resources that are allocated to the base stations, based on a data amount of data of a specific type, of which allocation is requested by each base station.

9. The system of claim 8,
wherein the data of the specific type is a guaranteed bit rate data.

10. The system of claim 8,
wherein the controller further determines the ratio of resources that are allocated to the base stations, based on communication results of each base station.

11. The system of claim 10,
wherein the communication results is information on any one or a combination of a time span for which communication is performed, a day of the week on which the communication is performed, throughput, the number of failures in connection, and an amount of data in each base station.

12. The system of claim 8, further comprising:
a base station which is owned by the carrier which is given the license, and which performs communication with a terminal device, using the resource that is allocated by the controller;
wherein the base station:
determines whether or not communication with the controller is possible;
determines a candidate for a resource that is used for the communication with the terminal device, based in a prescribed priority, in a case where the communication with the controller is impossible;
determines whether or not it is possible to allocate the candidate for the resource for the communication with the terminal device based on a communication environment; and performs the communication with the terminal device using the resource that is determined as being allocable.

13. The base station of claim 12, wherein the base station sets a priority in such a manner that a higher priority is set for a resource having a higher throughput.

14. The base station of claim 12, wherein the base station sets a priority of a resource, based on a communication scheme and throughput of each resource.

15. A method for controlling a used state of a resource for a secondary service, with respect to a carrier that is given a license, according to a used situation of a resource for a primary service that is allocated to an existing user, the method comprising:
   determining, by referring to a repository, whether or not the license is given to the carrier that owns each base station which requests resource allocation;
   determining, by a controller, whether or not it is possible to allocate the resource for the secondary service, based on the used situation of a resource for the primary service;
   determining, by the controller, a ratio of resources that are allocated to base stations that are owned by the carrier which is given the license, based on a prescribed parameter, in a case where allocation of the resource is possible; and
   transmitting, by the controller, allocation resource information to the base stations, the allocation resource information indicating the ratio of resources that are allocated to the base stations,
   wherein the controller determines the ratio of resources that are allocated to the base stations, based on a data amount of data of a specific type, of which allocation is requested by each base station.

\* \* \* \* \*